Figure 1:
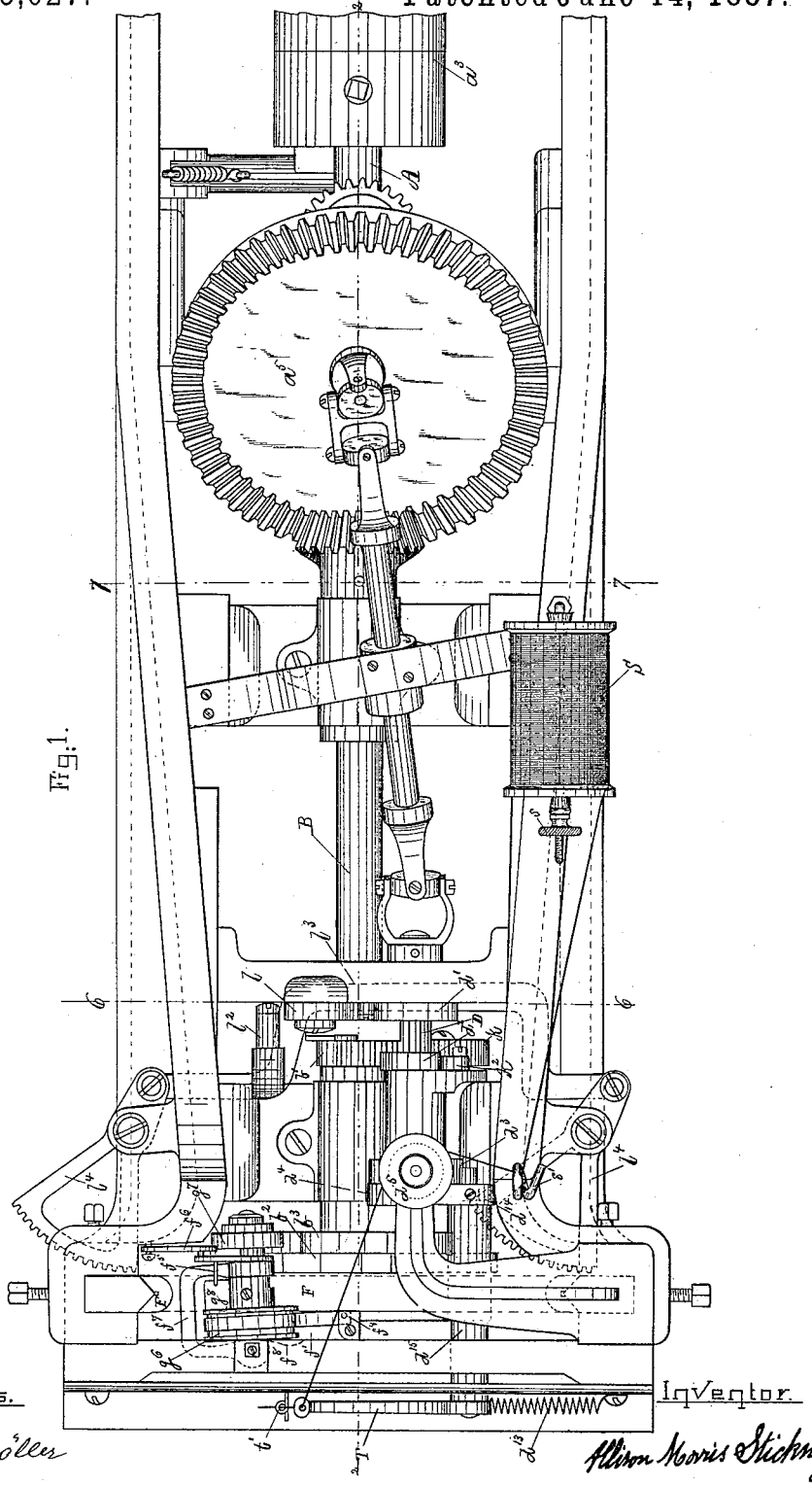

(No Model.)  12 Sheets—Sheet 1.

A. M. STICKNEY.
BOOK SEWING MACHINE.

No. 365,027.  Patented June 14, 1887.

Witnesses.  Inventor.
L. N. Miller  Allison Morris Stickney
John R. Snow (No Model.) 12 Sheets—Sheet 3.

A. M. STICKNEY.
BOOK SEWING MACHINE.

No. 365,027. Patented June 14, 1887.

Witnesses.
L. N. Möller.
John R. Snow.

Inventor.
Allison Morris Stickney (No Model.) 12 Sheets—Sheet 5.

A. M. STICKNEY.
BOOK SEWING MACHINE.

No. 365,027. Patented June 14, 1887.

Witnesses.
L. N. Möller
John R. Snow.

Inventor.
Allison Morris Stickney

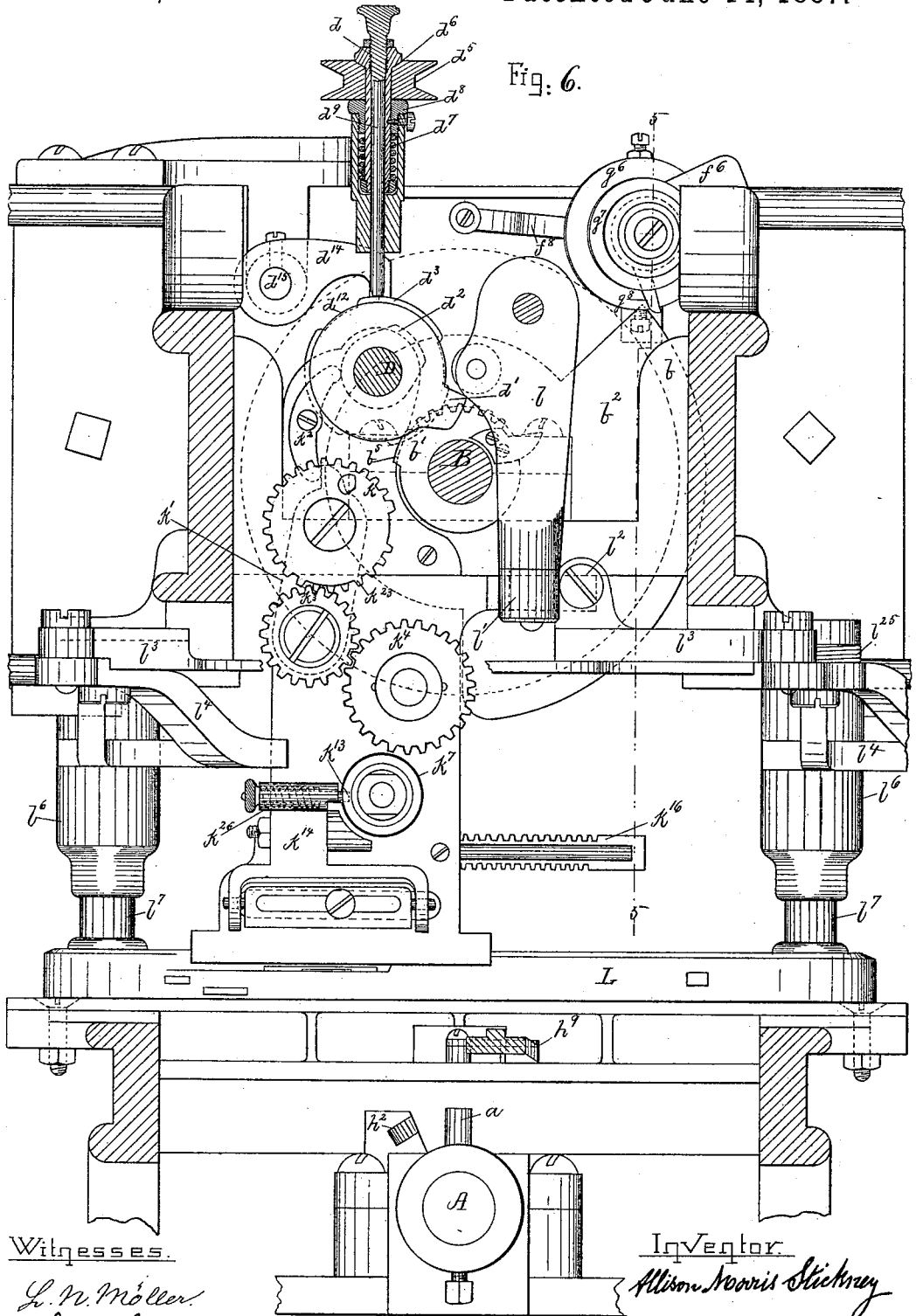

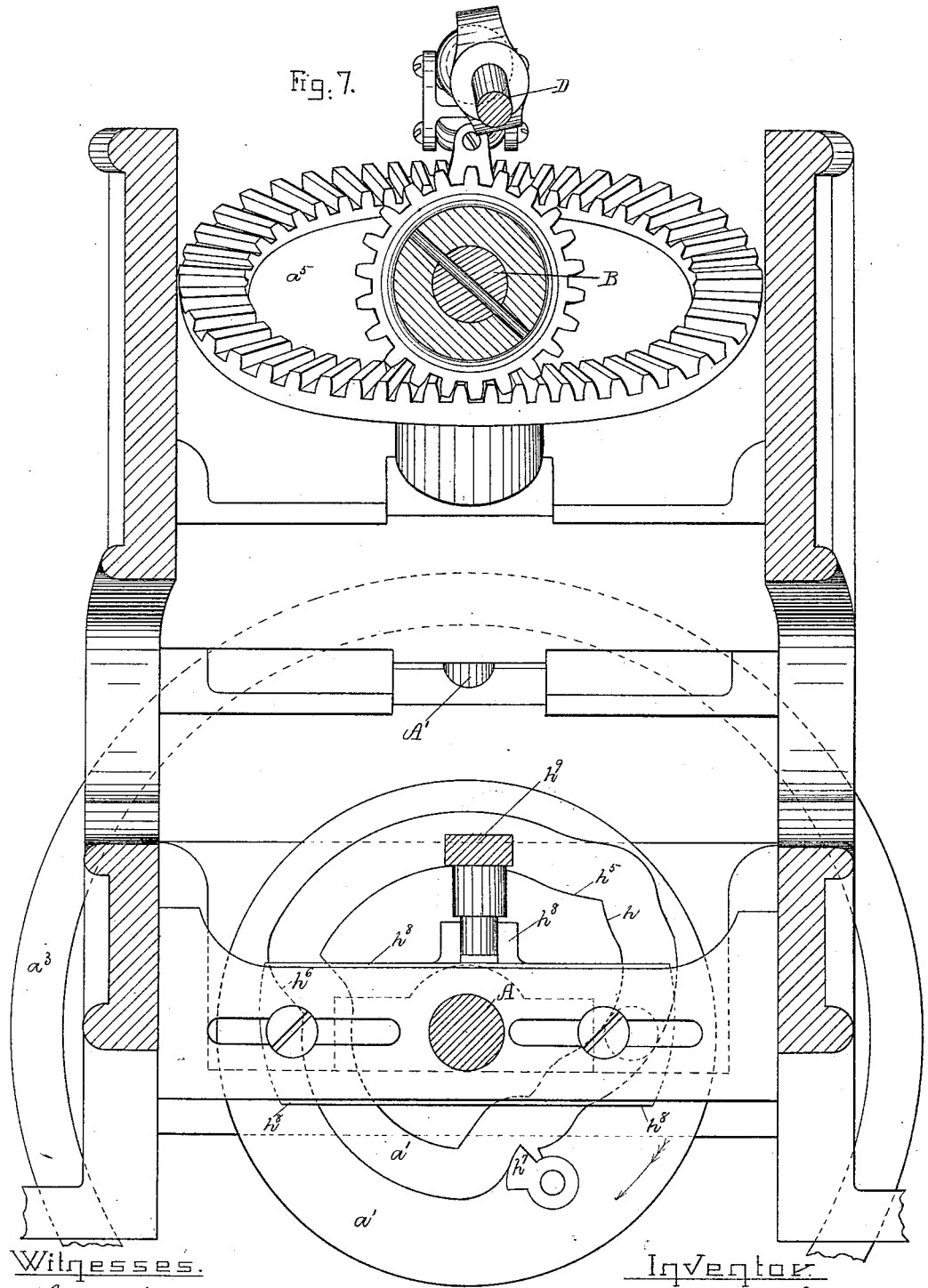

(No Model.) 12 Sheets—Sheet 8.
A. M. STICKNEY.
BOOK SEWING MACHINE.
No. 365,027. Patented June 14, 1887.
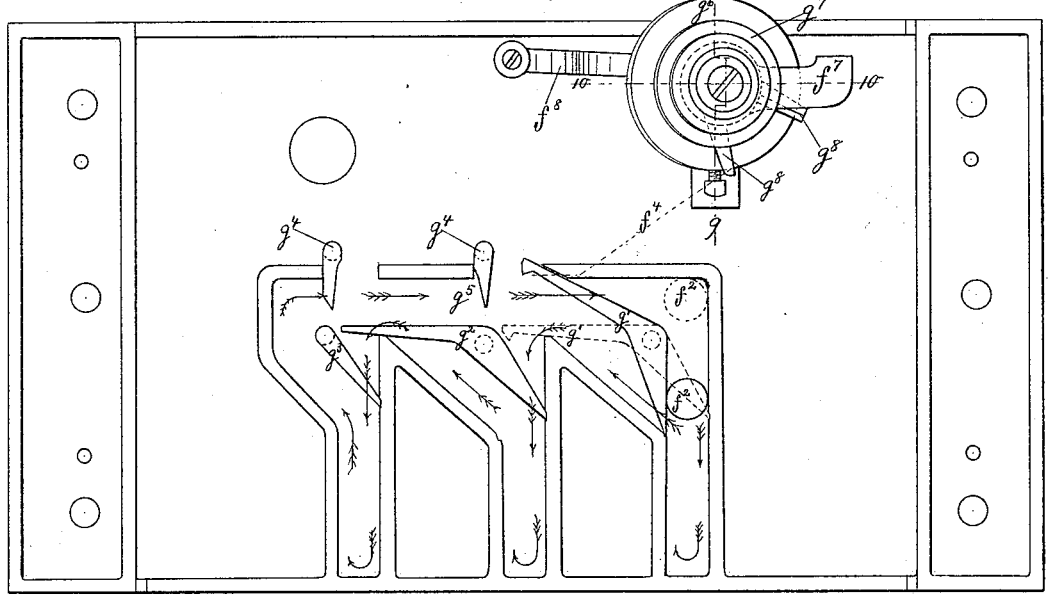
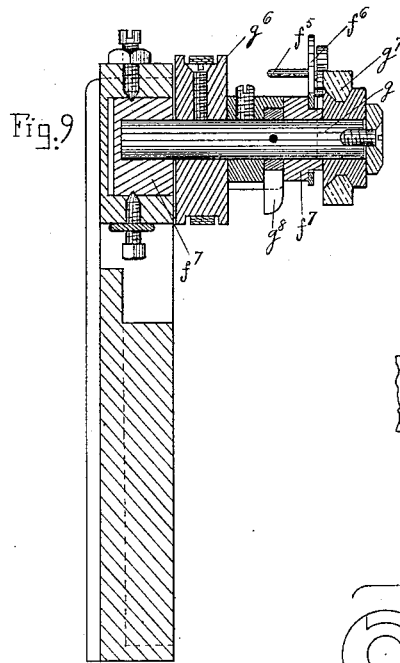
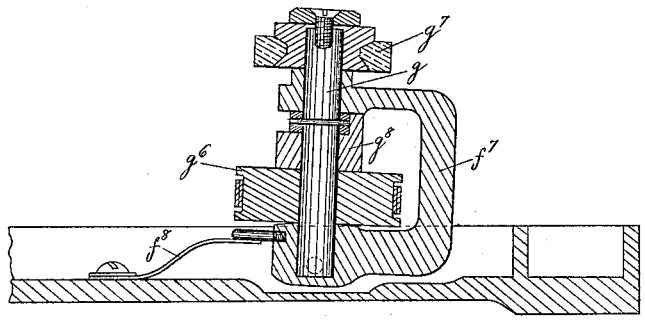
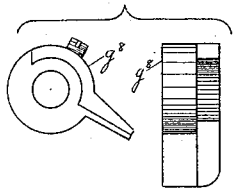
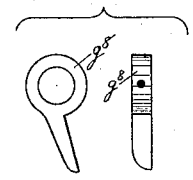
Witnesses.
L. N. Möller
John R. Snow
Inventor.
Allison Morris Stickney (No Model.) 12 Sheets—Sheet 9.
A. M. STICKNEY.
BOOK SEWING MACHINE.
No. 365,027. Patented June 14, 1887.
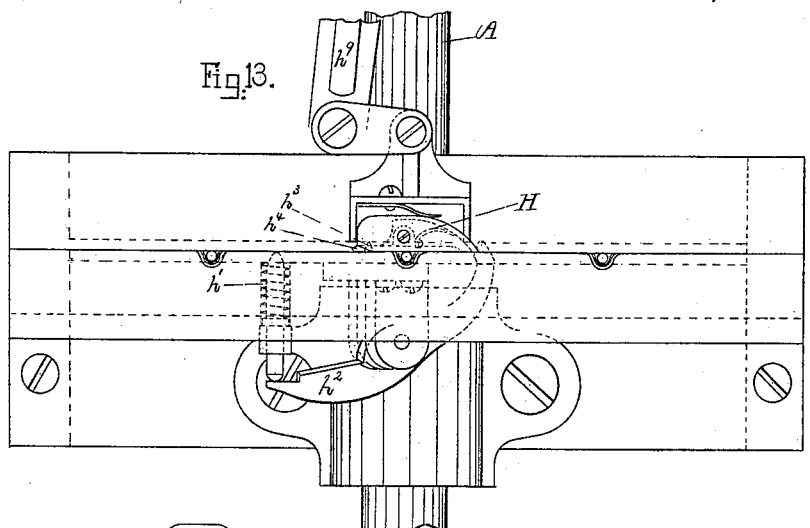
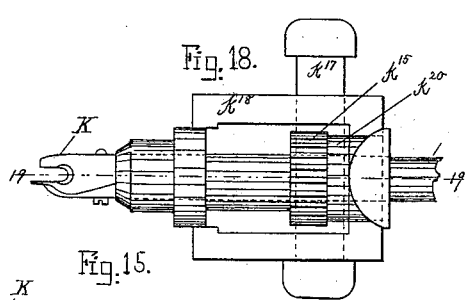
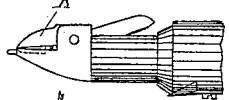
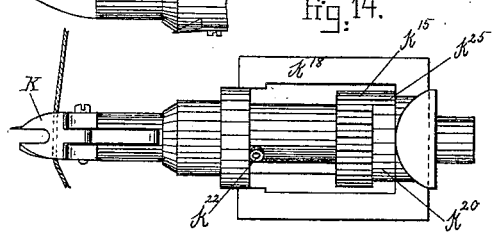
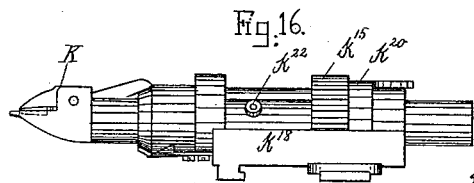
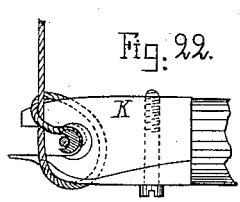
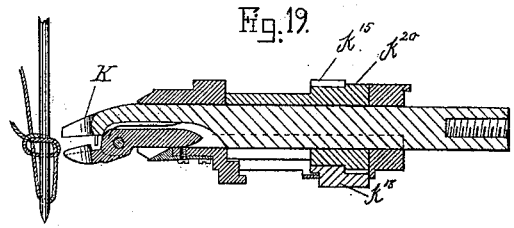
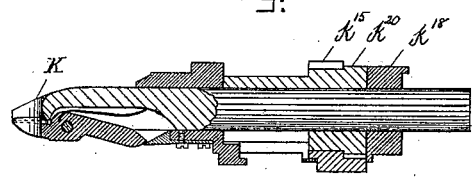
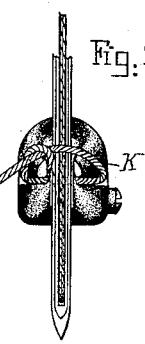
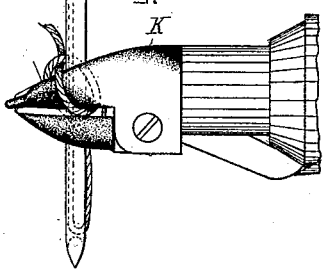
Witnesses.
L. N. Möller
John R. Snow
Inventor
Allison Morris Stickney

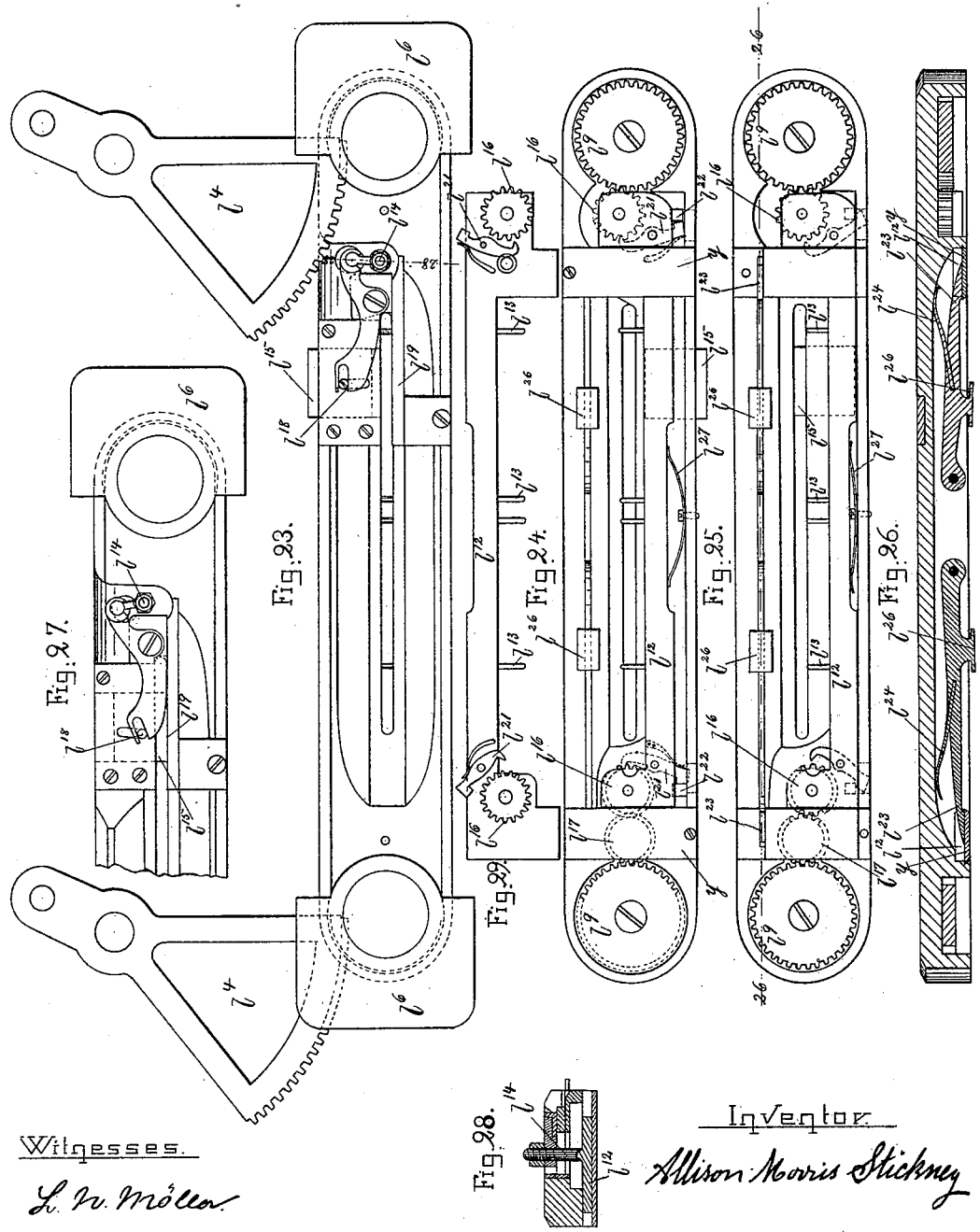

(No Model.) 12 Sheets—Sheet 11.

A. M. STICKNEY.
BOOK SEWING MACHINE.

No. 365,027. Patented June 14, 1887.

Witnesses.
L. N. Möller.
John R. Snow.

Inventor.
Allison Norris Stickney (No Model.)
A. M. STICKNEY.
BOOK SEWING MACHINE.
No. 365,027. Patented June 14, 1887.
12 Sheets—Sheet 12.
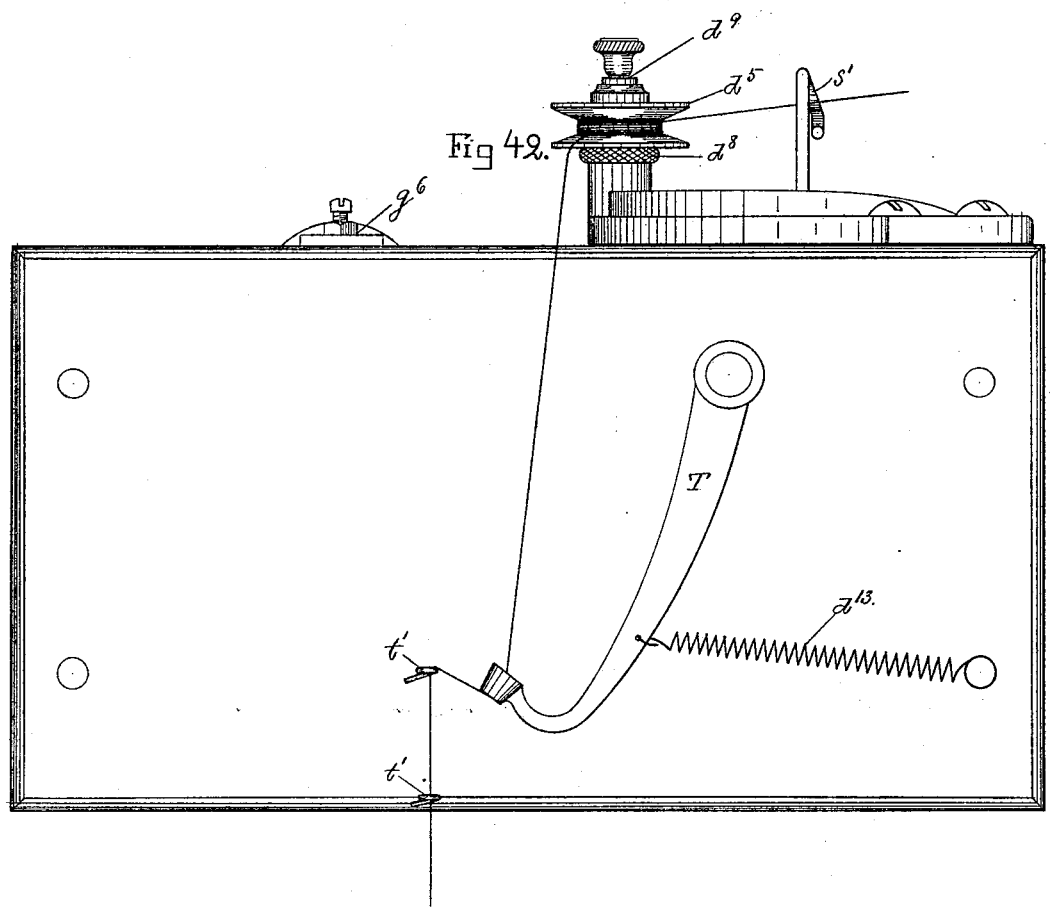
Witnesses.
L. W. Möller
John R. Snow
Inventor
Allison Morris Stickney

UNITED STATES PATENT OFFICE.

ALLISON MORRIS STICKNEY, OF MEDFORD, ASSIGNOR OF TWO-THIRDS TO HENRY RODMAN THOMPSON, OF NEWTON, MASSACHUSETTS.

BOOK-SEWING MACHINE.

SPECIFICATION forming part of Letters Patent No. 365,027, dated June 14, 1887.

Application filed July 3, 1886. Serial No. 207,036. (No model.)

*To all whom it may concern:*

Be it known that I, ALLISON MORRIS STICKNEY, of Medford, in the county of Middlesex and State of Massachusetts, have invented a Stitching and Tying Machine, of which the following is a specification, reference being had to the accompanying drawings, forming a part hereof.

My machine consists in the combination, with a needle, shuttle, tension, and take-up, (all much resembling an ordinary sewing-machine,) of a device for forming a bight of thread, through which the needle passes, in order to form a knot and tie the ends of the thread at each complete stitch.

While this combination is the main novelty of my invention, yet the bight former is also wholly new with me.

In that form of my machine shown in the drawings the needle must pass three times through the material, in order to make one complete stitch; but it will be obvious that the same stitch may be made with the needle passing but twice through the material, and also that a continuous knotted lock-stitch may be made if my bight-former be caused to operate at each stroke of the needle and an ordinary shuttle carrying a bobbin be used. While I have contemplated this latter form of machine and believe it will be highly useful in a large variety of work, I yet have preferred to show a single-thread machine requiring a special shuttle to take the first loop of thread thrown out by the needle, and to carry that thread through the other loops, thereby making a stitch especially adapted for pamphlets. Neither this shuttle nor this stitch is claimed in this application, for the reason that the stitch forms the subject of my application, Serial No. 185,569, and the shuttle of my application, Serial No. 184,255.

Figure 2:
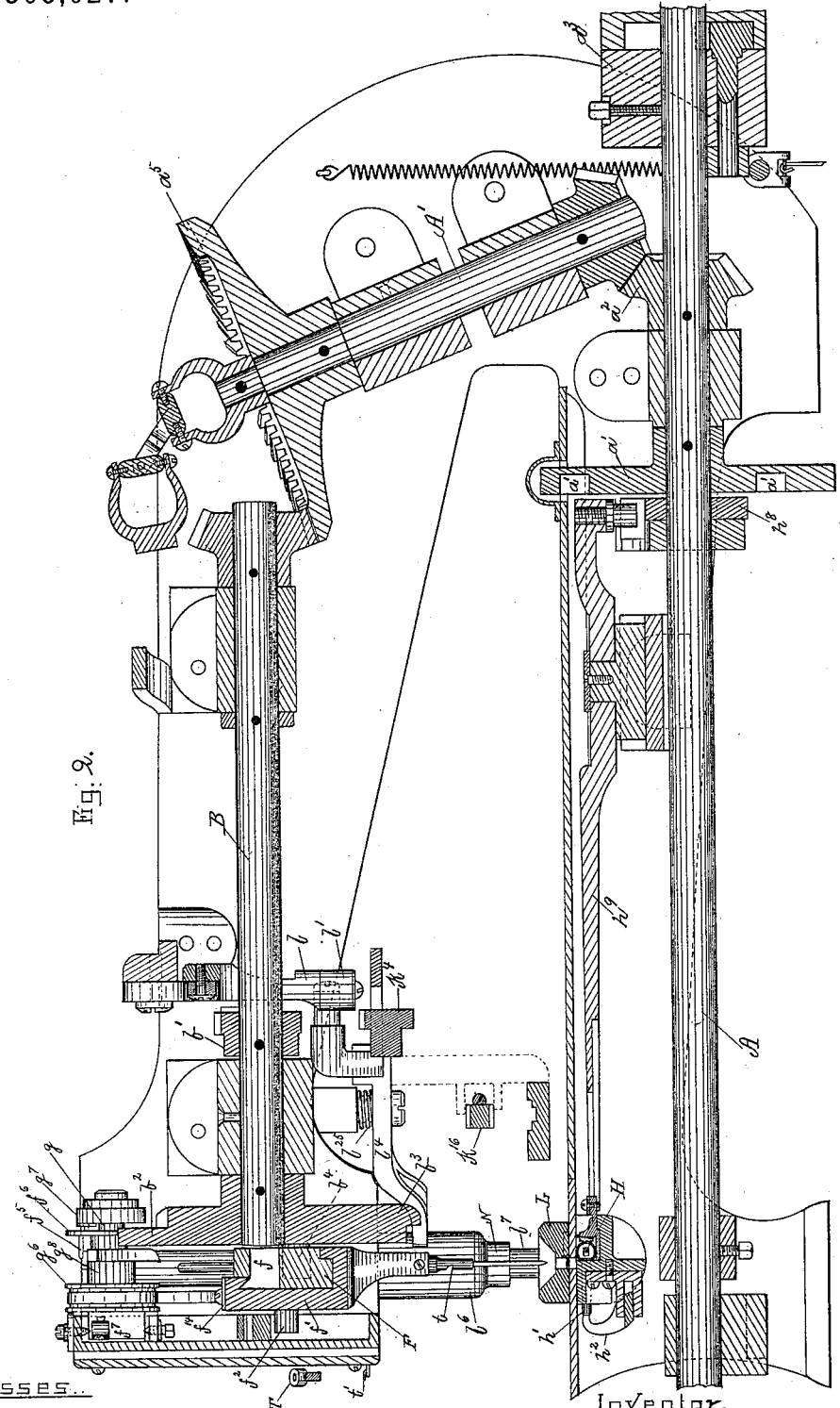
Figure 3:
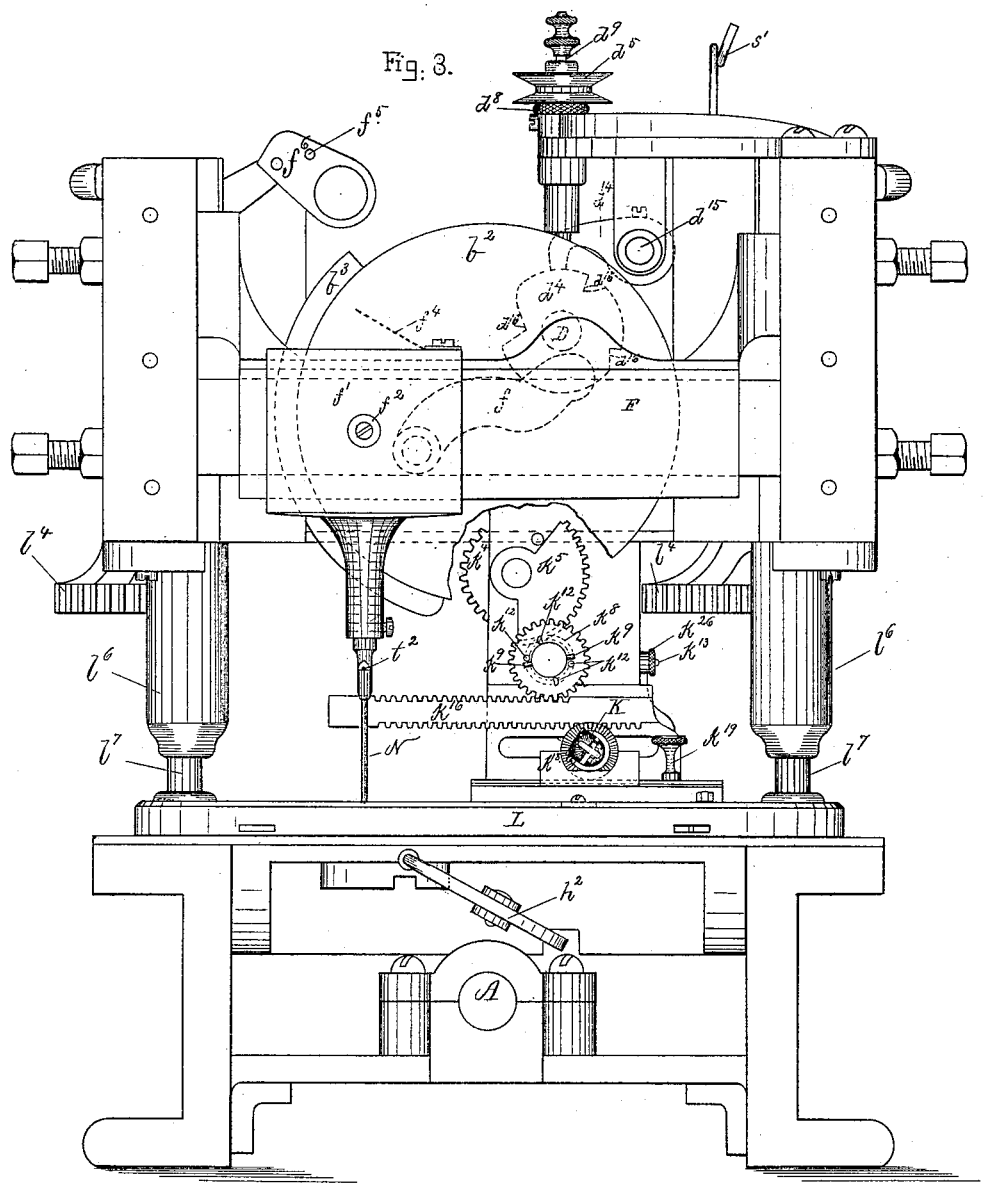
Figure 4:
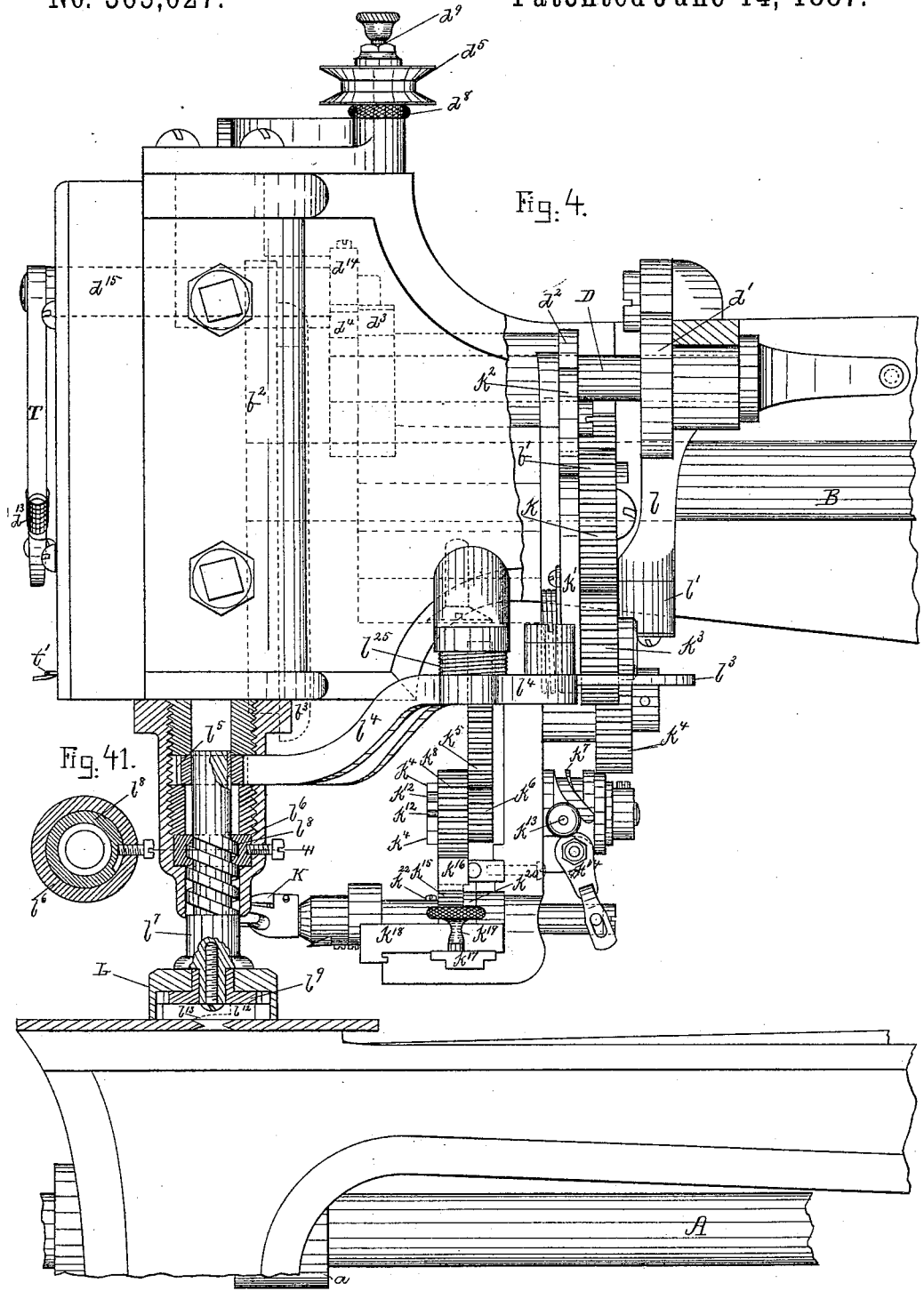
Figure 5:
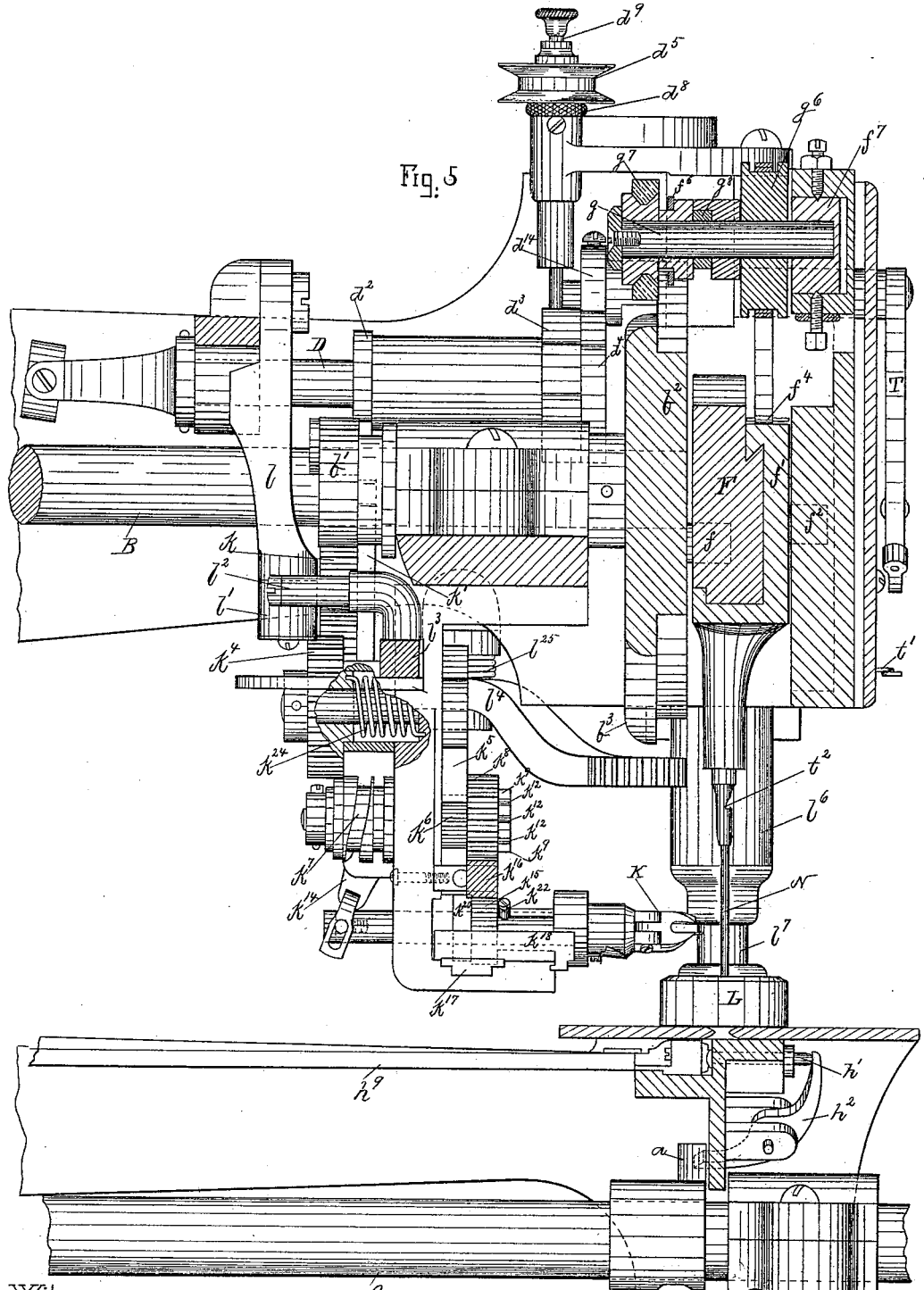
Figure 30:
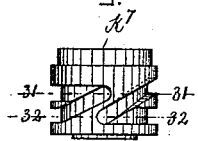
Figure 31:
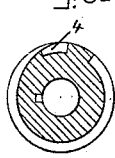
Figure 32:
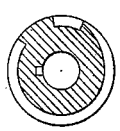
Figure 33:
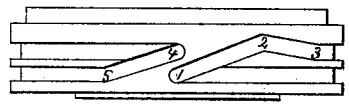
Figure 34:
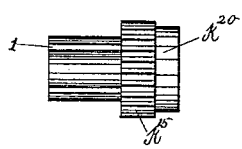
Figure 35:
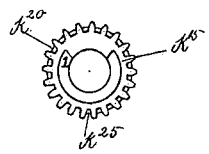
Figure 36:
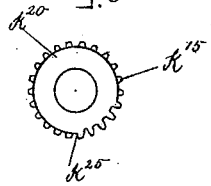
Figure 37:
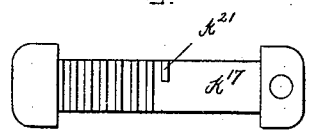
Figure 38:
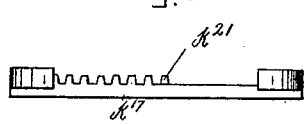
Figure 39:
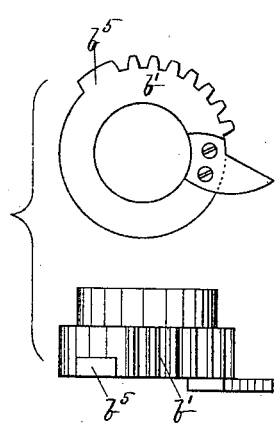
Figure 40:
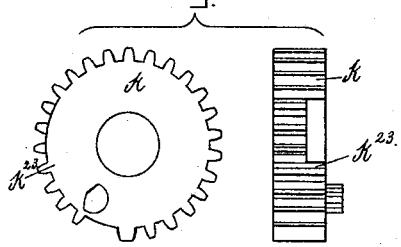

In the drawings, which illustrate that form of my machine especially adapted for stitching pamphlets, Figure 1 is a plan; Fig. 2, a longitudinal vertical central section; Fig. 3, a front elevation with needle-plate, Fig. 8, removed; Fig. 4, a side elevation of front part of machine, as seen from the right; Fig. 5, a section on line 5 5 of Fig. 6 of front part of machine, as seen from the left; Fig. 6, a cross-section on line 6 6, Fig. 1, looking from back of machine; Fig. 7, a cross-section on line 7 7, Fig. 1, looking from front of machine; Fig. 8, a rear elevation of needle feed-plate; Fig. 9, a section on line 9 9, Fig. 8; Fig. 10, a section on line 10 10, Fig. 8, looking up; Figs. 11 12, details of dogs $g^5$; Fig. 13, detail illustrating shuttle and shuttle-race; Fig. 14, top plan of bight-former, after having grasped thread; Fig. 15, side elevation of jaws of Fig. 14; Fig. 16, jaws drawn back, showing method of preventing thread from pulling jaws open while rotating; Fig. 17, section of bight-former, after bight has been formed while bight is still around jaws; Fig. 18, top plan of bight-former after it has been withdrawn from needle; Fig. 19, section on line 19 19 of Fig. 18, also showing needle with bight formed around it; Fig. 20, front elevation jaws of bight-former with knot formed around them enlarged; Fig. 21, side elevation of Fig. 20, enlarged; Fig. 22, top view of Fig. 20, enlarged; Fig. 23, top view of presser and cut-off; Fig. 24, bottom view of Fig. 23; Fig. 25, same as Fig. 24, with plates $y$ removed and pins $l^{13}$ withdrawn; Fig. 26, section on line 26 26, Fig. 25, showing catches; Fig. 27, top view of one end of presser, showing cut-off blade in position occupied by it when presser is in condition shown at Fig. 25; Fig. 28, a section on line 28 28, Fig. 23, showing standard operating cut-off blade; Fig. 29, plan of plate $l^{12}$; Fig. 30, an elevation of the cam of the bight-former; Fig. 31, section through line 31 31 of Fig. 30; Fig. 32, section through line 32 32 of Fig. 30; Fig. 33, development of surface of cam, Fig. 30; Fig. 34 elevation of gear of the bight-former; Fig. 35, front elevation of Fig. 34; Fig. 36, back elevation of Fig. 34; Fig. 37, plan of rack for giving sidewise motion to bight-former; Fig. 38, side elevation of Fig. 37; Fig. 39, elevation and plan of segmental gear for operating bight-former; Fig. 40, elevation and plan of first gear in bight-former train; Fig. 41, horizontal section on line 41 41 of Fig. 4; Fig. 42, front elevation of take-up and thread-guides.

My machine is threaded as follows, viz: Spool S is firmly held by thumb-nut $s$, the thread is passed through thread-guide S′, and is wound several times around tension-pulley $d^5$, thence through take-up T and through the two guides $t'$, from there through the guide $t^2$ in needle-sleeve and thence through eye of needle N.

The machine, as shown in the drawings, exhibits the position of parts as needle is making its first downward stroke.

A is the driving-shaft, having upon it latch-opener $a$ shuttle-cam $a'$, bevel-wheel $a^2$ transmitting motion to upper shaft, B, through shaft A', connected at lower end to shaft A by a bevel-wheel meshing with $a^2$. The lower shaft, A, has also upon it the driving-pulley and clutch $a^3$, which run the machine. This driving-pulley and its clutch is old. Its function is to allow the machine to be started at will and to cause main shaft A to stop in a certain position at each revolution. Upper shaft, B, is connected to shaft A' through a bevel-wheel one-third of diameter of driving-wheel $a^5$, so that this shaft B shall make three revolutions to one of driving-shaft. This combination affects only the machine shown in the drawings, as the combination may be made to suit the number of stitches to be made, be it two or more.

Connected to the back shaft, A', through gimbals, as shown in drawings, (or through proper gears, as will be well understood,) is the cam-shaft D. This shaft will make revolution for revolution with the driving-shaft A, and carries presser-cam $d'$, cam $d^2$ for bringing bight-former train in position to be operated upon at the proper time, tension-cam $d^3$, and take-up cam $d^4$. (See Figs. 5 and 6 and Figs. 1 and 3.)

The needle-shaft B has upon it the segmental gear $b'$, Fig. 39, for operating the bight-former, and the disk $b^2$ for giving the vertical motion to the needle N and its return motion from last stitch to its first position.

F is the slide, carrying needle-block $f'$, having cut in its back a cam-groove operated upon by wrist $b^4$ in disk $b^2$, Fig. 3. This cam is cut to provide, first, for the full downward stroke of needle; second, for lifting the needle enough to cause it to throw out a loop; third, for holding it in that position while shuttle takes its thread or passes through the loop thrown out, according to the stitch being made; fourth, for raising needle to its extreme height, and fifth, for holding it in that position while the bight-former does its work before the last stitch is made, and while needle is being returned to its first position after last stitch is made.

The movement of needle from left to right, Fig. 3, is brought about in the following manner: While the machine is at rest, the roller $f^2$ on needle-block $f'$ will be in position. (Shown in dotted lines in Fig. 8.) The latch $g^2$ in full lines and the latch $g'$ in dotted lines, Fig. 8, are in their position while the machine is at rest. The roller $f^2$ in its first downward movement pushes latch $g'$ to one side, as shown in full lines, Fig. 8. As soon as roller $f^2$ has passed the end of latch $g'$, the latch resumes its normal position, (that of the dotted line,) so that in its upward stroke the roller, being forced upward, is moved to the right (but Fig. 8 being a rear view to the left, of course, in that figure) by the inclined plane presented to it by the latches $g'$ $g^2$. The course of guide-roller $f^2$ is clearly indicated by the arrows in Fig. 8. The latch $g^3$ is used to carry the roller clear of latch $g^2$, so that it may be carried back to its starting-point. The latches $g^4$ are safety-latches, preventing the momentum of block $f'$ from carrying its wrist $f^2$ too far to the right, (the left in Fig. 8,) and they yield when wrist $f^2$ of block $f'$ is passing from right to left (left to right in Fig. 8) through channel $g^5$.

The return of needle to first position is brought about as follows, viz: $g^6$, Figs 1, 8, 9, and 10, is a pulley attached to a shaft, $g$, to which is also attached the friction-pulley $g^7$ and the adjustable dogs $g^8$, Figs. 11 and 12. The pulley $g^6$ has wound about it and attached to it by one end a steel band, $f^4$. The other end of this steel band is attached to needle-block $f'$. As the needle is moved from left to right, as above described, it unwinds the band from pulley $g^6$, and, revolving the shaft $g$, causes dogs $g^8$ to revolve with it. When the needle has reached the extreme limit of its movement to the right, one of the dogs $g^8$ is forced down against pin $f^5$ in toggle $f^6$. This straightens toggle and throws frame $f^7$, carrying the device toward the middle of machine, so that when the enlarged portion $b^3$ of disk $b^2$ presents itself it comes in contact with friction-roller $g^7$ and winds up the steel band, thus drawing back the needle-block $f'$ to its first position. This is accomplished while the needle is at rest in its uppermost position, as mentioned above. The needle-block $f'$, or its roller $f^2$, having again the position shown in dotted lines, Fig. 8, the other dog, $g^8$, near the end of reverse motion of shaft $g$, gives an upward stroke on pin $f^5$, thus throwing the toggle out of the straight line and allowing spring $f^8$ to throw frame $f^7$, with its friction-pulley $g^7$, out of contact with enlarged part $b^3$ of disk $b^2$. The needle having made its first downward stroke, and the first part of upward movement having thrown out a loop, the tension device holds the thread, preventing any more thread being pulled from the spool. This tension is made as follows, viz: $d^5$ is a grooved pulley, around which the thread is wound a sufficient number of times to prevent its slipping. This pulley runs on a sleeve, having upon its upper end a conical bearing, $d^6$. This cone is held down in a conical recess in the pulley by the spring $d^7$. This clamps the pulley between the top of collar $d^8$ and the conical bearing $d^6$. The spindle $d^9$ passes through the bearing, and by means of screw $d^{11}$ is brought into a nice adjustment with tension-cam $d^3$. Where the cam $d^3$ is cut away, as at $d^{12}$, Fig. 6, it allows full tension to spring $d^7$, and thus prevents the pulley $d^5$ from turning with any power that would not break the thread. When the spindle is in contact with cam $d^3$, pulley $d^5$ is entirely released from the pressure of the spring $d^7$, and is thus allowed to turn with that measure of freedom allowed by the amount of tension still acting to keep conical bearing $d^6$ in frictional contact with pulley $d^5$. The shuttle H now being moved backward by action of that part of shuttle-cam shown at $h$, Fig. 7, transmitted to shuttle through the sliding plate $h^8$ and lever $h^9$, Figs. 2 and 7, the hooked latch $h^4$ on shuttle passes through the loop, the latch being opened by plunger $h'$, operated by pin $a$ through lever $h^2$, the take-up T, Figs. 5 and 42, actuated by spring $d^{13}$, owing to the movement of take-up cam $d^4$, which at this point allows the bearing end of take-up actuating-lever $d^{14}$, connected to take-up by rock-shaft $d^{15}$, to drop into one of the depressions $d^{16}$ in take-up cam $d^4$, Fig. 3, takes up the slack of the loop formed at the eye of the needle, thus drawing the thread under tension-plate $h^4$ and back of hook $h^3$ in the shuttle H. At this point the pin $a$ releases the plunger $h'$ and its lever $h^2$, and the thread is held behind the hook $h^3$ and under the tension-plate $h^4$. The needle now makes its upward movement, being forced up and sidewise over the second throat, Fig. 13, by action of latch $g'$, Fig. 8, already described. As soon as the needle starts on its upward movement, the tension-cam $d^3$ slightly raises spindle $d^9$ and releases pulley $d^5$ from the pressure of cone-bearing $d^6$, thus allowing the necessary amount of thread to render off the spool, and the shuttle moves up into position to take second loop by action of part marked $h^5$ in shuttle-cam $a'$. The needle now makes its second downward and slight upward movement, which is just like its first movement, already described, and having thrown out its loop the shuttle, with the thread it carries, is passed through the loop by action of part $h^6$ of shuttle-cam $a'$. As the needle passes through the pamphlet to make the second puncture, the take-up T makes a short stroke, thus drawing from the spool thread enough to enable the shuttle to pass easily through the loop, while thread is given to the shuttle by the upward half of the short stroke of the take-up at the time the shuttle is passing through the loop. As the heel of the shuttle passes the second throat, the tension-cam $d^3$ allows spring $d^7$ to grip the tension-pulley, thus preventing any more thread from coming from the spool, and a downward movement of the take-up T, caused by spring $d^{13}$, draws up thread which had formed the loop, making a lock-stitch. The tension-pulley $d^5$ is then once more released, so as to give thread required by next movement of needle. After the shuttle has passed through the second loop and taken up its position ready for the third loop, the needle completes its second upward movement, and while needle is at rest over the third throat, Fig. 13, the bight-former advances, takes the thread extending from the middle throat to needle, and makes a bight by means described below. The needle now makes its last downward stroke, through the bight formed around bight-former K, and the bight-former withdraws, leaving the bight around the needle, Fig. 19, which now passes through the pamphlet, then slightly withdraws to throw out the loop, and the shuttle passes through the loop, the action of the needle, shuttle, tension, and take-up being the same as in the previous stitch up to point where shuttle has gone through the loop thrown out by the needle. A grip is once more taken on tension-pulley $d^5$ by cone-bearing $d^6$, and the shuttle moves back rapidly by means of the spring-latch $h^7$, shown in cam $a'$, so as to bring heel of shuttle directly under the throat. This spring-latch device is too well known to require further description. The thread, held by hook $h^3$ and tension-plate $h^4$ in shuttle H, has now rendered until it is held only by its extreme end. The needle starts in its upward movement, the take-up T drawing up the loose thread which had formed the loop as fast as the needle will allow it to. This pull on the thread has a tendency to draw the lower thread from the shuttle up through the knot around the needle, (shown at Fig. 19,) which knot around the needle slips off the end of needle as the needle rises, and the lower thread is drawn into that knot around the needle, and a quick motion of take-up tightens the knot, forming the well-known weaver's knot. The needle having reached its uppermost position again, the presser-cam $d'$, acting on lever $l$, cuts off the thread and raises the presser, as hereinafter described. The needle going back to point $f^2$, dotted lines in Fig. 8, as detailed above, the presser comes down, clamping the pamphlet at first movement of the machine.

The bight-former is constructed and operated as follows, viz: The gear $k$ is kept out of contact with gear $b'$ on upper shaft, B, by a spring operating on plate $k'$ in such a manner as to keep plate $k'$ in contact with the cam $d^2$, through the lever $k^2$. This cam $d^2$, making one revolution to three of the upper shaft, B, brings the gear $k$ into position to mesh with segmental gear $b'$, through the medium of the lever $k^2$, just before the needle reaches its last upward position. The gear $b'$ on shaft B engages gear $k$ after gear $k$ is brought into position, and through the intermediate $k^3$ causes the gear $k^4$ to make eight twenty-sixths of a revolution. Gear $b'$ and gear $k$ are each cut to twenty-seven teeth, and eight and thirty-one hundredths of these teeth operating on gear $k^4$, which has only twenty-six teeth, causes $k^4$ to revolve eight twenty-sixths of a revolution. The quadrant $k^5$, cut to fifty-two teeth thirty-two pitch, being on same shaft as gear $k^4$, also makes eight twenty-sixths of a revolution, equal to sixteen teeth. Quadrant $k^5$ gears into small gear $k^6$, having sixteen teeth, and this is thus caused to make one full revolution. Gear $k^6$ is attached to the shaft of cam $k^7$, Figs. 4 and 5, while gear $k^8$ runs loosely on the same shaft, and is controlled by strikers $k^9$ on the end of the shaft coming in contact with pins $k^{12}$ in gear $k^8$. The distance between pins $k^{12}$ is equal to one-fourth of the circumference of their circle of rotation plus the width of striker, so that the effect of the action of quadrant $k^5$ on gear $k^6$ will be to revolve said gear with its shaft and cam $k^7$ one-fourth of a revolution without moving gear $k^8$. This one-fourth of a revolution of cam $k^7$ causes jaws K of the bight-former to advance under the needle, but a little to the left of it, by forcing pin $k^{13}$ from position 1 to 2, Fig. 33, which is the development of cam $k^7$. The connection between the shaft of the bight-former and cam $k^7$ is through lever $k^{14}$, as clearly shown in Figs. 4, 5, and 6. The jaws K having now reached their position and closed around the thread, as shown at Fig. 14, the striker $k^9$, being in contact with pins $k^{12}$ in gear $k^8$, cause gear $k^8$ to revolve with gear $k^6$. Gear $k^8$, having twenty-six teeth and having been idle during one-fourth of a revolution of gear $k^6$, acts on rack $k^{16}$ only through the remaining three-fourths of its teeth, equal to nineteen and one-half teeth. The motion of gear $k^8$ moves rack $k^{16}$, which revolves gear $k^{15}$. The gear $k^{15}$ meshes with a stationary rack, $k^{17}$, and controls the rotary motion of the jaws K of the bight-former, and also their side movement, as follows: The hub of gear $k^{15}$ is slotted, as shown in detail Figs. 34 and 35, to allow of a free advancing and retreating movement of the shaft of the bight-former, and this slot is made of such a width as to allow gear $k^{15}$ to turn seven-fortieths of a revolution without acting on the shaft upon which it turns. This seven-fortieths of a revolution moves the gear $k^{15}$, its carriage $k^{18}$, and the bight-former five-sixteenths of an inch to the right by reason of gear $k^{15}$ meshing with the rack $k^{17}$, stationary but adjustable by the screw $k^{19}$. Having reached its extreme position, which is that where jaws K are brought directly under the needle in the last upward position of the needle, the smooth surface $k^{20}$, part of and turned to the pitch-line of gear $k^{15}$, Figs. 34, 35, and 36, bears against last tooth $k^{21}$ of rack $k^{17}$, Figs. 37, 38, and is thus held in position while the bight-former completes its work. Carriage $k^{18}$ having been thus moved to its second position by the action of three and one-half teeth out of the twenty on gear $k^{15}$, the edge 1 of the slot in the hub of gear $k^{15}$, Figs. 34, 35, now comes in contact with roller $k^{22}$ in bight-former shaft and causes that shaft to revolve until it assumes the position shown at Fig. 17. This partial revolution of the jaws K of the bight-former (about five-eighths of a full revolution) forms a bight in the thread by turning the thread around one of the jaws, as shown in Figs. 20, 21, and 22. This is accomplished by the following combination: We have seen that a full revolution of gear $k^6$ causes gear $k^8$, having twenty-six teeth, to revolve through a portion of a revolution equal to nineteen and one-half of its teeth, three and one-half teeth of the twenty teeth of gear $k^{15}$ being required to move it to the right, thus using seven teeth of rack $k^{16}$—i. e., three and one-half teeth of rack $k^{16}$—for revolving the gear $k^{15}$, and three and one-half of rack $k^{16}$ lost through the side motion of the gear $k^{15}$ of the remainder of the nineteen and one-half teeth of gear $k^8$. Twelve and one-half are used to revolve the bight-former jaws from position in Figs. 3, 4, 5 to position in Fig. 17. Just after the jaws K of the bight-former have taken the thread they are drawn back one-eighth of an inch, or under the needle, by action of cam $k^7$, by forcing pin $k^{13}$, from position 2 to position 3, Fig. 33. From 3 to 4, Fig. 33, the pin $k^{13}$ runs in a straight groove, holding the jaws in position shown at Fig. 16. At 4, Figs. 31 and 33, pin $k^{13}$, having been forced back into its sheath $k^{26}$ by the incline in groove of cam, (shown at 4 in section of cam, Fig. 31,) drops over the end of incline into position 4, Fig. 33, ready for its return movement. These movements have been accomplished while needle, at its last upward position, remains stationary.

In order to hold the bight-former jaws in position, Fig. 17, while the needle is going through them to form the knot, the long tooth $b^5$ on segmental gear $b'$, Figs. 6 and 39, holds the train in position by remaining in contact with tooth $k^{23}$ on gear $k$. The bight being now upon the needle—that is, the needle having passed down through the bight—the long tooth $b^5$ on gear $b'$, Figs. 6 and 39, recedes from the tooth $k^{23}$ on gear $k$. This causes the jaws K of bight-former to resume the position shown in Figs. 3, 4, 5, in the following manner, viz:

At $k^{24}$, Fig. 5, a coiled spring is shown. One end of this spring is attached to frame, the other to hub of gear $k^4$. The revolution of gear $k^4$ has wound up this spring so that when free to act by gear $b'$ releasing gear $k$ the spring causes the return motion of the device. The first part of this movement causes the gear $k^6$ to make its first one-fourth revolution without moving gear $k^8$. During this portion of its movement the pin $k^{13}$ is forced from position 4 to position 5, Fig. 33, causing the backward movement of bight-former jaws, thus withdrawing them from the needle, leaving the knot formed by them around the needle, as shown in Fig. 19. At this juncture the strikers K$^9$ come in contact with pins K$^{12}$ in gear $k^8$, causing that to revolve, and through rack $k^{16}$ causing gear $k^{15}$ to turn, thus bringing the bight-former jaws back to position shown in Figs. 3, 4, 5. When gear $k^{15}$ has revolved to point $k^{25}$, the teeth shown as cut through the smooth surface $k^{20}$ engage the rack $k^{17}$ at $k^{21}$, and the continued revolution of gear $k^{15}$ draws it back to its former position, and it carries with it the bight-former and carriage $k^{18}$.

The presser L is operated by cam $d'$. This cam is timed in such a manner as to raise the presser just after knot has been tied and to lower it at first movement of the machine. Connection is made between cam $d'$ and presser L through lever $l$, the end $l'$ of which is in contact with roller $l^2$ on rod $l^3$. This rod connects the lever ends of quadrants $l^4$. These quadrants actuate the gears $l^5$ in presser-standards $l^6$. These gears $l^5$ are feathered onto shafts $l^7$ in such a manner as to allow complete freedom of endwise motion to the shaft through the gear, but compelling the shafts to rotate with the gears. A left-hand thread is cut on each shaft. (See Fig. 4.) This screw works in nuts $l^5$. These nuts $l^8$ are fitted loosely in the standard so that they may rotate a few degrees with the screw; the degrees of rotation being determined by the length of the slot shown in section, Fig. 41, for the purpose of allowing certain work to be done before the shafts $l^7$ begin to move endwise, as hereinafter shown. The lower extremity of shafts $l^7$ carry within the presser the gears $l^9$. Within the presser is the plate $l^{12}$, fitted upon its edge with pins $l^{13}$. These are to prevent undue tension by the thread on the holes in the material worked upon. This plate $l^{12}$ also carries the standard $l^{14}$, actuating the cutting-off blade $l^{15}$. Upon the ends of this plate are pinions $l^{16}$, the one on the right of presser gearing in one gear, $l^9$, and the one on the left of machine gearing in intermediate $l^{17}$, which in turn gears into the other gear, $l^9$. The blade $l^{15}$ is connected by lever $l^{18}$ and its link to standard on plate $l^{12}$, and operates inversely to the plate—i. e., when plate $l^{12}$ moves back the blade moves toward plate $l^{19}$, and when plate $l^{12}$ moves forward blade $l^{15}$ moves back. Pawls $l^{21}$ are fitted to pinions $l^{16}$. These pawls are held in the position shown in Fig. 24 (locking the pinions) by blocks $l^{22}$; but in the position of plate $l^{12}$ (shown in Fig. 25) they are thrown out of contact with the pinions by springs allowing the pinions $l^{16}$ to rotate either way without acting on plate $l^{12}$, Fig. 29.

In the position shown in Figs. 2, 3, 4, 5, 6 the presser L is down, and its attachments are in the position shown in Figs. 23 and 24. After the stitch is completed and the knot tied, cam $d'$ acts on lever $l$, and through it on rod $l^3$, thus working the quadrants $l^4$ and thereby rotating shafts $l^7$. During the first part of this rotation the nuts $l^8$ rotate with the shafts, and the presser is not raised until the nuts $l^8$ are prevented from rotating by coming in contact with the stop shown in section in Fig. 41. During this portion of the rotation the gears $l^9$ act on pinions $l^{16}$; but as these pinions $l^{16}$ are firmly held by their pawls $l^{21}$ they cannot rotate, but must act as racks; hence the plate $l^{12}$ is carried back into the position shown at Fig. 25. In this position the latches $l^{23}$, Fig. 26, are allowed to spring out by the withdrawal of plate $l^{12}$, and by tension of spring $l^{24}$ hold plate $l^{12}$ back in the position shown in Fig. 25. At the same time the butt ends of pawls $l^{21}$ have cleared blocks $l^{22}$, and are consequently thrown from contact with the pinions $l^{16}$ by their springs, Figs. 25 and 29. The pins $l^{13}$ are withdrawn from under the stitches, the blade $l^{15}$ has been brought in contact with plate $l^{19}$, as shown and described above, and the thread is nipped between blade $l^{15}$ and plate $l^{19}$. This movement of plate $l^{12}$ is accomplished by the partial rotation of shafts $l^7$ with the nuts $l^8$; but when the nuts are held by their stops the presser rises to its extreme height, which is in this case one-half inch from bed-plate. During this operation the needle in machine is moving back to its first position, the thread rendering through the eye of the needle, and at the proper moment a sudden gripping of tension-pulley $d^5$ causes a pull on thread sufficient to cut it off where nipped between blade $l^{15}$ and plate $l^{19}$. At the first movement of the machine cam $d'$, rotating out of contact of lever $l$, allows springs $l^{25}$, which have been wound up by the previous movement of segments $l^4$, to bring down the presser by throwing segments $l^4$ in the opposite direction. During this downward movement plate $l^{12}$ is still held back by latches $l^{23}$, thus allowing pinions $l^{16}$ to rotate freely about their axis until such time as the presser comes down upon the goods to be stitched. Now, the plates $l^{26}$, Fig. 26, fast to latches $l^{23}$, are forced back into the presser, forcing latches $l^{23}$ back and releasing plate $l^{12}$, and allowing spring $l^{27}$, Figs. 24, 25, to force plate $l^{12}$ ahead, thus throwing pawls $l^{21}$ into pinions $l^{16}$ and converting them into racks, and carrying plate $l^{12}$ and blade $l^{15}$ and pins $l^{13}$ into positions shown in Figs. 23 and 24. The springs $l^{25}$, acting on quadrants $l^4$, allow the presser to stop at any point between its two extreme positions, according to the thickness of goods or material placed under it, while cam $d'$ will always bring it up to its extreme height. The combination of gears, pinions, pawls, and blocks described above allows the plate $l^{12}$ and blade $l^{15}$ to be acted upon, as shown above, at the first movement of shafts, regardless of the position of presser, be it down on plate or up to its extreme height.

The general operation is as follows: The pamphlet is placed on the table and under the presser, so that the needle is vertically over that part of the pamphlet in which the first needle-hole is to be made, the position of the pamphlet being determined by the eye or by suitable gages. The presser is then forced down, clamping the pamphlet between the presser and the table, and the downward movement of the presser also brings the thread-holding pins in place near the throats and draws back the cut-off blade. The needle then descends, making its first puncture, and is drawn slightly back to throw out the loop; the shuttle is then moved heel first until its hook grasps the loop thrown out by the slight backward movement of the needle, and then moved point first until it comes into proper relation with the second throat, and during this time the needle rises and moves bodily sidewise over the second throat; the needle then descends through the second throat, is slightly withdrawn to throw out the second loop, and the shuttle is passed nose first through the second loop, carrying with it the needle-thread which it pulls down through the first puncture. As the shuttle gets through the second loop, the needle rises and moves sidewise over the third throat, the shuttle taking proper position in relation to the third throat as it passes through the second loop. The bight-former then moves forward and straddles the thread extending from the second throat to the needle, moves sidewise under the needle and over the third throat, then turns on its axis to form the bight, and the needle descends through the bight held in place by the jaws of the bight-former and continues descending down through the material and the third throat. As soon as the point of the needle has passed through the bight the bight-former moves back rapidly out of the way, leaving the bight around the needle and thereby forming a single bow-knot in the needle-thread, the bow of that knot extending down through the material along each side of the needle and through the eye of the needle. The needle is then slightly drawn back to throw out the loop, and the shuttle passes nose first through the loop, carrying with it the shuttle-thread, which is that part of the needle-thread pulled down through the first puncture, and as the needle rises up through the third throat the thread of the shuttle is pulled up toward the bight formed in the upper needle-thread and then, tightened by the take-up, the lower thread carried by the shuttle is doubled up through that bight, forming a weaver's knot. Of course the take-up operates at each stroke of the needle much as in the common shuttle sewing-machine.

The needle, as it rises from the third throat, moves back over the first throat, ready to make a new stitch. The presser also rises, and just before it releases the pamphlet the thread-holding pins are pulled out from between the thread and the pamphlet, and the cut-off blade is thrown forward with its cutting-edge against the thread, which extends from the knot up through the slot in the presser to the eye of the needle. I prefer to have the edge of the cut-off blade grip the thread just before the needle gets back over the first throat, and then to tighten the tension, so that the latter part of the movement of the needle sidewise will pull the thread against the edge of the cut-off blade, as this means a perfect operation of the cut-off, and also because the proper length of thread from the free end of the thread to the eye of the needle is left hanging from the needle and ready to be used as a shuttle-thread in making the next stitch.

In case a knot is desired at each puncture of the needle, the shuttle should carry a bobbin, as in common shuttle sewing-machines, and in that case the bight-former should operate to form a bight around the needle at each descent of the needle, and the needle would move up and down only, as in the ordinary sewing-machine. It will also be clear that the bight-former may be made to operate once for every two, three, four, or other desired number of punctures.

What I claim as my invention is—

1. The bight-former above described, composed of two slotted or forked jaws, in combination with mechanism, substantially such as is described, to open and close the jaws, to seize and release the thread, and to rotate the jaws to form a half-turn in the thread, substantially as and for the purpose set forth.

2. The presser, two or more throats, the single needle, means, substantially such as described, for advancing the needle from one throat to another, the shuttle, and the bight-former, combined and operating substantially as described.

3. The presser L, in combination with the plate $l^{12}$ and cut-off blade $l^{15}$, and actuating mechanism, substantially such as is described, whereby the plate $l^{12}$ and cut-off $l^{15}$ are moved before the presser L commences to move up and remain stationary until the latches $l^{23}$ are forced back by the clamping of the work by the downward movement of presser L, all substantially as described.

4. In a sewing-machine, the combination of the needle with two or more throats and with two slides, F and $f'$, and means, substantially as described, for moving the main slide F to cause the needle to work forward and back through each throat and for moving the second slide, $f'$, to cause the needle to travel from the first throat over the second and from the last throat back over the first throat, all substantially as described.

ALLISON MORRIS STICKNEY.

Witnesses:
EDWARD S. BEACH,
JOHN R. SNOW.